April 21, 1953     F. R. BICHOWSKY     2,635,431
METHOD AND APPARATUS FOR INTERCONVERSION
OF HEAT AND ELECTRICITY
Filed Dec. 22, 1949     4 Sheets-Sheet 1

INVENTOR.
Francis R. Bichowsky
BY Pierce, Scheffler & Parker
his attys

April 21, 1953 F. R. BICHOWSKY 2,635,431
METHOD AND APPARATUS FOR INTERCONVERSION
OF HEAT AND ELECTRICITY
Filed Dec. 22, 1949 4 Sheets-Sheet 2

INVENTOR.
Francis R. Bichowsky
BY
Pierce, Scheffler + Parker
his attys

April 21, 1953   F. R. BICHOWSKY   2,635,431
METHOD AND APPARATUS FOR INTERCONVERSION
OF HEAT AND ELECTRICITY
Filed Dec. 22, 1949   4 Sheets-Sheet 3

INVENTOR.
Francis R. Bichowsky
BY
Pierce, Schiffler + Parker
his attys

April 21, 1953  F. R. BICHOWSKY  2,635,431
METHOD AND APPARATUS FOR INTERCONVERSION
OF HEAT AND ELECTRICITY
Filed Dec. 22, 1949  4 Sheets-Sheet 4

INVENTOR.
Francis R. Bichowsky
BY
Pierce, Scheffler & Parker
his attys

Patented Apr. 21, 1953

2,635,431

UNITED STATES PATENT OFFICE 2,635,431

METHOD AND APPARATUS FOR INTERCONVERSION OF HEAT AND ELECTRICITY

Francis R. Bichowsky, Alexandria, Va.

Application December 22, 1949, Serial No. 134,394

14 Claims. (Cl. 62—1)

1

This invention relates to methods and means for the reversible inter-conversion of electricity and heat.

This application is a continuation-in-part of my application Serial No. 357,039, filed September 16, 1940, and of my application Serial No. 537,857, filed May 29, 1944, now abandoned.

An object of the present invention is to provide an apparatus and method for the performance of the reversible thermodynamic cycle wherein heat is absorbed in one portion of the cycle and emitted in a second portion; wherein electric energy is absorbed or produced in a third portion of the cycle. It is an advantage of a thermodynamic cycle of this class that it may be usefully employed to produce refrigeration or heating or both refrigeration and heating or for the production of electricity from heat.

Other objects of the invention will be apparent to those skilled in the art, during the course of the following description.

Referring now to the drawings.

Figure 1:
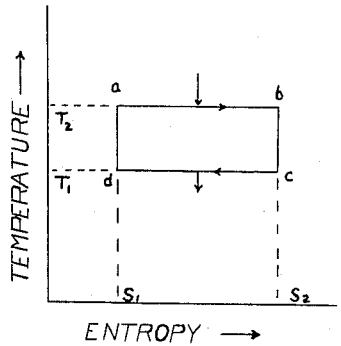
Fig. 1 is a diagram showing the successive changes of temperature and entropy in the thermodynamic cycle in accordance with this invention.

Referring now to the drawings:

Fig. 1 shows on a temperature-entropy chart the successive entropies and temperatures of an element of the apparatus undergoing what is known in the art as a Carnot cycle. A Carnot cycle can be operated in the direct mode, or in the reverse mode. In the direct mode starting with the element at the state $a$, namely at the temperature $T_2$ and with the entropy $S_1$, the element firstly (Step 1) changes reversibly its entropy at the constant temperature $T_2$, arriving at the state $b$, characterized by the temperature $T_2$ and the entropy $S_2$. In the course of this isothermal process, heat will be absorbed in the amount $-T_2(S_2-S_1)$. From the state $b$, the element secondly (Step 2) changes its temperature isentropically (adiabatically), that is without change of entropy, from the temperature $T_2$ to the temperature $T_1$. Since this process is adiabatic no heat will be lost in the change. The element is now at the temperature $T_1$, and at the entropy $S_2$ characterizing state $c$. Thirdly (Step 3), the element now at state $c$ changes its entropy from $S_2$ to $S_1$, its temperature remaining constant at $T_1$. In the course of this change heat will be given out to the amount $T_1(S_1-S_2)$. Fourthly (Step 4) the element now at state $d$ characterized by the temperature $T_1$, and entropy $S_1$, is changed adiabatically from the state $d$ to the state $a$. No heat is either absorbed or given out in this process. The element now at the state $a$ is in the state to repeat the cycle. It is an elementary fact in thermodynamics that a cycle so described will convert a portion of the heat absorbed in step 1 into work. The amount of this work will be $(T_2-T_1)(S_2-S_1)$.

A Carnot cycle, since each step is reversible, can be reversed; that is to say the steps can be traversed in the opposite order. Such a manner of traversing the cycle is called the reverse mode.

Step $1r$.—Starting with the element in state $d$, the entropy is increased from $S_1$ to $S_2$ at constant temperature $T_1$ until state $c$ is reached.

Step $2r$.—Starting with the element in state $c$ it is allowed to heat adiabatically from $T_1$ to $T_2$ to the state $b$.

Step $3r$.—Starting with the state $b$, the entropy of the element is reduced from $S_2$ to $S_1$ isothermally to the state $a$.

Step $4r$.—Starting with the element in state $a$, it is adiabatically cooled from $T_2$ to $T_1$ to the state $d$, thus closing the cycle.

In the reverse mode of operating, the element will absorb heat at the lower temperature $T_1$ to the amount $T_1(S_1-S_2)$ and will give out heat at the temperature $T_2$ to the amount $-T_2(S_1-S_2)$. Since heat is absorbed at a lower temperature and discharged at a higher temperature, apparatus in which the changes of state are in accord with the Carnot cycle may be used as a refrigerator, or since it discharges heat at a high temperature, it may be used as a heat pump, discharging at the high temperature the amount of heat, $T_2(S_1-S_2)$. Operating either as a heat pump or as a refrigerator, work must be done on the apparatus to the amount $(T_2-T_1)(S_2-S_1)$.

Operating in accordance with the direct mode, a portion of the heat absorbed will be converted into work. Operating in accordance with the reverse mode, work will be converted into heat. The cycle thus allows the inter-conversion of heat and work.

It is proven in thermodynamics that the Carnot cycle is the most efficient possible cycle for the inter-conversion of heat and work. Nevertheless, in the prior art, no apparatus is available for carrying out a Carnot cycle on a practical scale. One of the purposes of this invention is to provide apparatus for carrying out a Carnot cycle on a practical scale.

Figure 2:
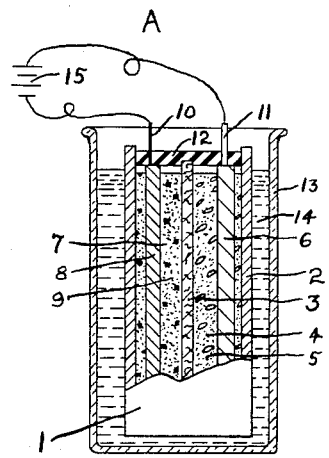
Fig. 2 shows in partial cross-section an apparatus in which the invention may be carried out.

Referring now to Fig. 2 of the drawing, wherein is shown an element capable of undergoing the reversible changes of entropy and temperature necessary to carry out the Carnot cycle, 1 designates a reversible voltaic cell, shown partly in section. The voltaic cell comprises a thin cup-like shell 2 which may be of metal but preferably is of resin or plastic. This shell is separated by a porous partition 3 which may be of paper, asbestos or cloth or similar materials into two compartments 4 and 7. One of the compartments 4 so formed contains a paste 5 of fine crystals of lead chloride impregnated with an electrolyte which may be a solution of hydrochloric acid. The compartment 4 contains also a plate 6 of pure lead. An electrical lead 11 is provided so that the electricity can enter or leave the lead plate. The second compartment 7 includes a silver electrode 8 and a paste 9 of finely divided silver chloride. A lead wire 10 is provided connecting the silver plate with an outside electrical circuit. The cell is provided with a seal of insulating material such as wax 12 which serves to prevent loss of electrolyte and holds the elements in their proper positions. The cell is shown enclosed in a larger vessel 13 containing a strong solution of antifreeze, e. g. methyl alcohol, sodium chloride, or the like in water in the space 14. 15 is a source of or user of electricity such as a generator, motor or primary or secondary battery.

If current is passed through the cell in the positive direction, i. e. so that electrons enter the cell through the lead 10, and leave the cell through the lead 11 the following changes will take place. Lead (Pb) from the plate 6 will go into solution forming lead ion (Pb++) which will react with hydrochloric acid (HCl) producing lead chloride (PbCl$_2$) in paste 5. On the other side of the partition silver chloride (AgCl) of paste 9 will disappear and silver (Ag) will deposit on the silver electrode 8 and chloride ion (Cl−) will be formed. The net chemical reaction so produced when current is flowing in the positive direction will be Pb+2AgCl→2Ag+PbCl$_2$. If current is passed through the cell in the opposite or negative direction, electrons entering the lead 11 and leaving the lead 10, the reverse action will take place: silver will go into solution, lead chloride will be used up and silver chloride and lead will be formed. The net chemical reaction of the cell (current flowing in the negative direction) will be 2Ag+PbCl$_2$→2AgCl+Pb. The process occurring in the cell is thus reversible. Experiments show that this process is accompanied by a relatively large change in entropy. If two Faradays of electricity are passed through the cell in the positive direction, there will be increase in entropy $\Delta S$ of +8.32 entropy units. If the cell is operated in the negative direction, there will be a decrease in entropy of −8.32 entropy units. Since the process in the cell is reversible, the heat absorbed operating in the positive direction will be $T\Delta S$ and the heat given out when the cell operates in the reverse direction will be $-T\Delta S$.

Figure 3:
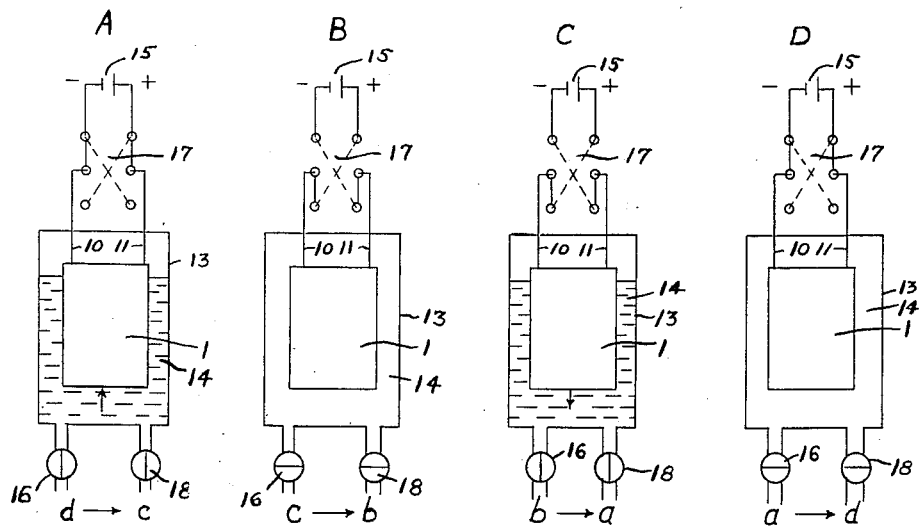
Figs. 3A, 3B, 3C and 3D show diagrammatically the apparatus according to Fig. 2 at various stages of the thermodynamic cycle shown in Fig. 1.

*Step 1r.*—Referring now to Fig. 3, starting with the cell 1 at the temperature of 275° K., in thermal contact with a body to be cooled which may be, as shown in Fig. 3A, brine or other refrigerant delivered into the space 14 through valve 16; electrons are allowed to flow via lead 10 and reversing switch 17 to a means for utilizing electricity 15 which may be a storage cell, thence via the lead 11 back into the cell 1. This may be accomplished by closing the reversing switch 17. In the course of flow of electricity in this direction, the direct reaction will take place, the entropy will increase to the amount of +4.16 entropy units per Faraday of current flowing and heat to the amount of 4.16×275=1144 calories will flow from the refrigerant 14 to the cell 1, thus cooling the refrigerant. In order that this process may be done at a desired constant temperature the valves 16 and 18 are opened allowing refrigerant to enter by the valve 16 and leave by the valve 18 of a desired rate. This accomplishes the change of state from $d \to c$ of Fig. 1.

*Step 2r.*—If now the refrigerant is removed from space 14 and replaced by an insulator, which may be air or vacuum as shown diagrammatically in Fig. 3B, and the valves 16 and 18 are closed and the switch 17 is reversed so that electrons which previously entered the lead 11, now enter the lead 10, the continuing flow of current in reverse direction will produce heat in the cell 1. Since cell 1 is insulated, the heat produced will cause the temperature of cell 1 to rise to a desired temperature $T_2$. This will accomplish the adiabatic change from $c$ to $b$ shown as the second reversing step in Fig. 1.

*Step 3r.*—When the temperature of cell 1 has reached $T_2$, say 300° K., the valves 16 and 18 are opened, thus allowing a coolant to be put in heat exchange relation with cell 1 as shown in Fig. 3C. Coolant is allowed to flow through the valves 16 and 18 at approximately constant temperature until the state has changed from $b$ to $a$. During the process heat to the amount of $$4.16 \times 300 = 1248$$

calories will flow from cell 1 to the coolant thus completing Step 3r.

*Step 4r.*—The coolant is now drained from the vessel 13 through the valve 18 and replaced by an insulator which may be air or vacuum as shown. The reversing switch 17 is now reversed so that the electrons which previously entered the cell 1 through the lead 10 now enter the cell 1 through the lead 11. The process is continued until the cell 1 changes from state $a$ to state $d$ as shown in Fig. 3D. There will be no flow of heat during this process since cell 1 is insulated but the temperature of cell 1 will fall to the temperature and entropy corresponding to the state $d$. In the course of the steps described a reversible Carnot cycle will be accomplished. The refrigerant in Step 1 will be cooled still further, the coolant in Step 3 will be heated and work will be done by the flow of electricity during the Steps 3 and 4 while the battery 15 will be recharged at a lower voltage during Steps 1 and 2. If the temperature of cell 1 was at 27° C. and that of the refrigerant and coolant approximately at the same temperature, the amount of refrigerating effect in Step 1 will be —1143 calories, the amount of heating effect during Step 3 will be 1247 calories. The amount of work done on the battery during Steps 1 and 2 will be 11,200 calories; the amount of work done on the battery during Steps 3 and 4 will be 11,300. The difference or net work will be 100 calories. The ratio of the net work done to the refrigerating effect in Step 1 will be 1143/100. Since the Carnot cycle is the most efficient cycle possible, the ratio of the net work done to the heat transferred which is the work ratio of the cycle will be the highest possible. Such a cycle, therefore, is the most efficient of all refrigerating cycles. It is also the most efficient heat pump, transferring heat from the temperatures $T_1$ to $T_2$ with the minimum expenditure of work.

Figure 4:
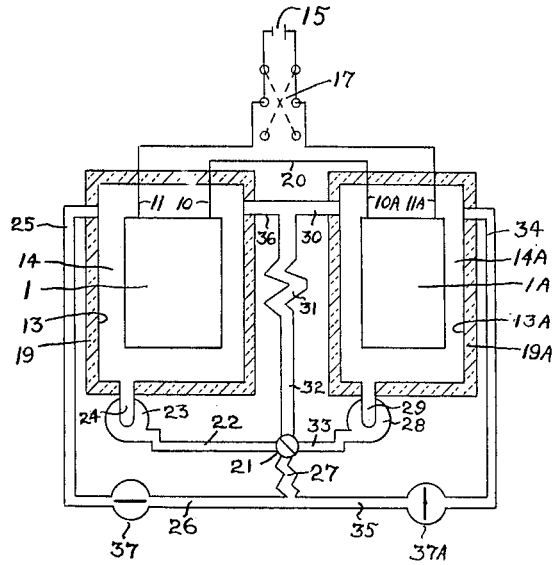
Fig. 4 shows in diagrammatic cross-section a second embodiment of the invention.

Referring now to Fig. 4. In operating with a single cell 1 in accordance with the manner illustrated in Fig. 3, the useful effect, refrigeration, power or heat produced is intermittent which may be a disadvantage in some applications, furthermore the voltage applied to the cell 1 is considerable, being approximately half a volt at room temperature. In the mode of operation and embodiment of invention shown in Fig. 4, useful effect is nearly continuous and the voltage which must be applied to the two cells 1 and 1A is very much reduced. In Fig. 4 two identical cells 1 and 1A similar to that shown in Fig. 2 are employed. In this embodiment which in the illustrative example is described for the case where the useful effect is refrigeration the two jackets 13 and 13A are insulated with the sheaths 19 and 19A. The cells are so connected that current entering cell 1 through the lead 11 connected to a lead electrode leave the cell 1 through the lead 10 which is connected (see Fig. 2) to a silver electrode. The current leaving the cell 1 by lead 10 will flow by the wire 20 and will enter cell 1A through the lead 10A connected to a silver electrode, and leave the cell 1A by the lead 11A connected to a lead electrode. Since like electrodes are connected the cells will be said to buck each other and if the cells are at the same temperature no current will flow if no external source of voltage is applied. By connecting a source of current which may be battery 15 through the reversing switch 17, a small voltage may be applied, in which condition current will flow through the cells in such a way that while cell 1 is heating, cell 1A will be cooling and while cell 1 is cooling, cell 1A will be heating. Since the two cells buck each other, only the difference of voltage between the two cells need be applied by the source 15.

*Step 1r.*—Consider now the cell 1. During the time that it is cooling, namely during the time cell 1 is changing from state *d* to state *c* (see Fig. 1) with the valve 37A closed the four-way valve 21 may be adjusted so that a refrigerant flows only through the pipe 22, the pump 23, the pipe 24, the chamber 14, the pipes 25 and 26, and the heat exchanger 27. During this period the cell 1A will be heating. At the same time a coolant may be caused to circulate by pump 28 through the pipe 29, the chamber 14A, the pipe 30, the heat exchanger 31 and back via pipe 32, valve 21 and pipe 33 to the pump 28. In this arrangement heat will leave the system through the exchanger 31, refrigeration will be produced by heat entering the system by the exchanger 27.

*Step 2r.*—The pumps 23 and 28 are now stopped and the reversing switch 17 will be adjusted so the current will flow through cell 1 and cell 1A in a reverse manner. Since the jackets 13 and 13A are insulated no heat will be lost or gained by cells 1 and 1A during this step. The flow of electricity will be continued until the cells reach the desired temperatures.

*Step 3r.*—At the desired temperatures the four-way valve 21 is reversed, valve 37A opened and valve 37 closed so that the coolant will flow only from the pump 23 by the pipe 24 through jacket 13, pipes 36 and 32, heat exchanger 31, valve 21 and pipe 22, thus closing the cooling circuit. During the time of flow, heat will be extracted by means of the heat exchanger 27. At the same time the refrigerant will flow by the pump 28 through the pipe 29, through the chamber 14A, the pipes 34, the valve 37A, and the pipe 35, back through heat exchanger 27, valve 21 and pipe 33—thus completing the circuit. As result of the flow of refrigerant through the jacket 13A heat will be transferred from cell 1A to the refrigerant producing a useful refrigerating effect at the heat exchanger 27. This process is continued until the desired refrigerating effect has been attained in the cell 1A, and the desired heating effect has been attained in cell 1.

*Step 4r.*—At the end of Step 3r cell 1 is at a high temperature and is discharging heat to the outside via the heat exchanger 31, while cell 1A is at a low temperature producing refrigeration via the heat exchanger 27. The switch 17 is now reversed and the pumps 23 and 28 are stopped. Because of the changed direction of the current in the cells 1 and 1A, cell 1 will cool down and cell 1A will heat up. Since the flow has stopped and the cells are insulated no heat will be lost by this step, and the cells will be returned to their initial condition.

With the particular embodiment shown in Fig. 4, it is preferable to have the refrigerant and coolant of the same chemical composition because the fluid once used as a refrigerant is later used as a coolant. It is an advantage of this embodiment that either one cell or the other is cooling the greater portion of the time and not one-fourth of the time as in the embodiment shown in Fig. 3.

In the embodiments of Figs. 3 and 4 both the reactants and products of the cell reaction are solids. They are lead, lead chloride, silver and silver chloride. The cell reaction may, however, be between any pair of reactants, solid or liquid or gas, that can undergo in a voltaic cell a reversible electrochemical reaction characterized by a large change of entropy. Among these reactions are copper with iodine to form cuprous iodide and lead oxide with sulfuric acid to form lead sulfate.

Particularly advantageous are the class of reversible electrochemical reactions involving liquids and gases only. If reactions of this class are used the process of interconversion of heat and electricity can be made continuous.

Figure 5:
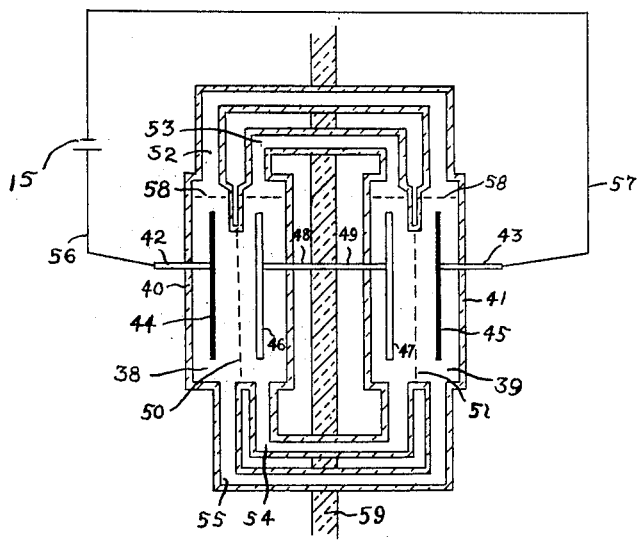
Fig. 5 shows in cross-section a third and at present preferred embodiment of the invention.

Fig. 5 shows two identical voltaic cells 38 and 39. The walls 40 and 41 of the cells may be of glass or plastic, or any other insulating material. Supported in the cells by lead wires 42 and 43 are black platinized electrodes 44 and 45, and bright electrodes 46 and 47. These electrodes are supported by lead wires 48 and 49 which in the embodiment shown are continuous. Permeable partitions 50 and 51 may be provided. Leading out of the two cells are long narrow connecting tubes 52 and 53. The bottoms of the two cells are similarly connected by two tubes 54 and 55. A source of direct current shown as a primary cell 15 is connected to the lead wires 42 and 43 by the wires 56 and 57. The insides of both cells are filled with concentrated hydrochloric acid to the level 58. The two cells are mounted on either side of a thermally insulated partition 59 which divides the surroundings into a hot space which may be the outside of a refrigerator cabinet, and into a cold space which may be the inside of a refrigerator cabinet. Fins or other heat exchange devices (not shown) may be provided to facilitate the transfer of heat into or out of the cells 38 and 39.

On passing a current through the cells so that the electrons enter by the wire 42 and leave by the wire 43 electrochemical reactions will occur on the electrodes. Designating electrons by the symbol $\ominus$, the reaction occurring on the black electrode 44 will be $2\ominus + 2H^+ \rightarrow H_2(gas)$, hydrogen gas will be given off. On the bright electrode 46 the reaction will be $$2Cl^- = 2Cl_2(gas) + 2\ominus$$

chlorine gas being given off. On the bright electrode 47 the reaction will be $2\ominus + Cl_2 = 2Cl^-$, chlorine gas being taken up. On the black electrode 45 the reaction will be $H_2 = 2H^+ + 2\ominus$. The gross reaction in cell 38 being $$2HCl(Aq) \rightarrow Cl_2 + H_2(gas)$$

The entropy change in this reaction is about 6.0 per mol of hydrochloric acid electrolyzed. The chlorine gas formed at the bright electrode 46 will flow by way of pipe 53 into cell 39 where it will be in part dissolved and will be in contact with the bright electrode 47. The hydrogen gas formed at the black electrode 44 will flow by way of pipe 52 into cell 39 where it will in part dissolve and will be in contact with the black electrode 45.

In cell 39 the chlorine and hydrogen will respectively lose and gain an electron forming hydrochloric acid in solution, the gross reaction being $Cl_2(gas) + H_2(gas) = 2HCl(Aq)$. The hydrochloric acid formed will flow by pipe 54 to cell 38, maintaining the concentration in that cell constant, the water in the form of a weak solution returning by pipe 55 to cell 39. The net result of the flow of electrons will be the absorption of heat (refrigeration) in cell 38, the loss of heat (heating) in cell 39, the flow of hydrogen and chlorine from cell 38 to 39 and the flow of hydrochloric acid and water from cell 39 to 38. This process will continue as long as the current flows, since the flow of chlorine and hydrogen and of hydrochloric acid will keep the concentrations in the two cells the same at all times.

As hereinbefore described, the process occurring in the embodiment shown in Fig. 5 is substantially that of a Carnot cycle operating in the reverse mode. The process occurring in cell 38 of Fig. 5 corresponds to the step $c$ to $d$ of Fig. 1. The substantially adiabatic process occurring in tubes 53 and 52 corresponds to the step $c$ to $b$ in Fig. 1. The process occurring in cell 39 corresponds to the step $b$ to $a$ in Fig. 1. The process occurring in tubes 54 and 55 corresponds to the step $a$ to $d$ of Fig. 1.

The embodiment may also be operated in the direct mode. If in Fig. 5 the primary cell 15 is removed and replaced by a power using device such as an electric motor, and if a source heat (not shown) is provided to maintain the hot space at a high temperature, and if means (not shown) are provided to remove heat from the cold space, the apparatus will operate as a Carnot cycle of the direct mode, heat being absorbed by the cell 39 and emitted by the cell 38. In the course of this process electrons will flow from cells 39 via the lead wires 48 and 49 into the cell 38 and will leave that cell via the lead wire 42 and via the wire 56 will pass through the motor or other energy absorbing device producing power and will be returned via the wire 57 and lead 43 to the cell 39. The cycle then will correspond to a Carnot cycle of the direct mode, heat being in part converted continuously into electricity. The embodiment operating in this mode thus serves as a means for continuously generating electric current at the expenditure of heat.

Figure 6:
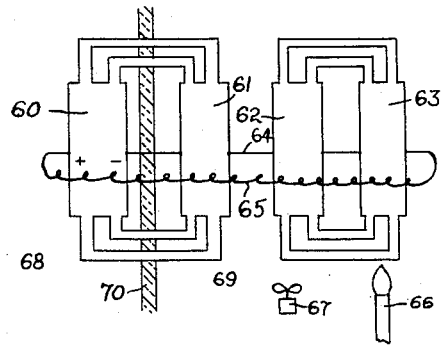
Fig. 6 shows diagrammatically in elevation a fourth embodiment of the invention.

Fig. 6 shows diagrammatically two sets of cells 60 and 61 and 62 and 63. Each of these cells is substantially identical with the cells 38 and 39 of Fig. 5. The two pairs of cells are connected by wires 64 and 65 in such a way as to "buck" each other. There is provided on cell 63 a source of heat shown diagrammatically as a burner 66, and there is provided a means of cooling cell 62, shown diagrammatically as a fan 67. Under these conditions the combination of cells 62 and 63 will operate in the direct mode and serve as a source of electricity. The combination of cells may therefore serve in place of the battery 15 in Fig. 5 as a power source to drive the combination of cells 60 and 61 operating in the reverse mode. Driven in this way by the electrical energy produced in cells 62 and 63, cell 60 will absorb heat from the surroundings and cell 61 will discard heat to the surroundings. Cell 60 may therefore serve as a source of refrigeration or cooling the space 68. It is convenient to interpose a heat insulating wall 70 between the cold space 68 and the hot space 69. The combination of four cells 60, 61, 62 and 63 serves as a heat operated refrigerating device of very high efficiency and low cost. For example, if the cell 63 is kept 200° F. and the cell 62 at 100° F. and cell 61 is kept at 100° F., cell 60 will absorb heat down to the temperature of about 10° F. 70 is an insulated partition between the cells 60 and 61 similar to the partition 59 in the apparatus of Fig. 5.

Figure 7:
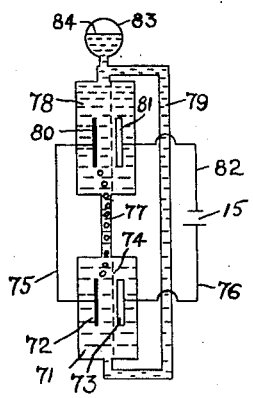
Fig. 7 shows in diagrammatic cross-section a fifth embodiment of the invention.

Fig. 7 shows diagrammatically another embodiment of the invention. This embodiment is particularly adaptable for electrochemical reaction wherein one of the products of the electrochemical reaction is gaseous and the other is liquid. The example of this class of reaction is the reaction $$2Fe^{++}(Aq) + 2H^+(Aq) \rightarrow 2Fe^{+++}(Aq) + H_2(gas)$$

This is written above in accordance with the electrochemists convention which shows only the substances in the equation which undergo change in the electrochemical process.

Figure 8:
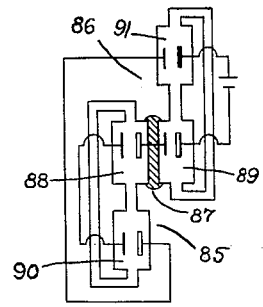
Fig. 8 shows in diagrammatic cross-section a sixth embodiment of the invention.

In the embodiment of Fig. 7 this reaction is carried out in a cell 71 provided with a black platinized electrode 72 and a bright inert electrode 73. The cell 71 may be provided with a permeable partition 74 the purpose of which is to partially keep the materials formed at electrodes 72 and 73 from intermixing. The cell 71 is filled with a strong solution of some ferrous salt dissolved in a concentrated acid. For example, cell 71 may be filled with a strong solution of ferrous sulfate dissolved in sulphuric acid solution. If now a current is passed through the cell by the leads 75 and 76 from a source 15 in such a direction that electrons enter the black electrode 72 and leave by the bright electrode 73, hydrogen gas will be evolved at the surface of electrode 72 and ferrous ion will be oxidized to ferric ion on the surface of the bright electrode 73. This reaction involves a large increase of entropy and therefore heat will be absorbed from the surroundings of cell 71. The hydrogen gas formed on electrode 72 will bubble up the narrow tube 77 into the upper cell 78. The passage of the bubbles of gas through tube 77 will cause a thermosyphon action, the liquid in cells 71 and 78 flowing from cell 71 through tube 77 to cell 78 and backward through the connecting tube 79 to cell 71. Cell 78 is identical in structure to cell 71 and is provided with a black electrode 80 and a bright electrode 81. These electrodes are connected with leads, electrode 72 being directly connected with electrode 80 by the wire 75 and electrode 81 being connected by the wire 82, the source of electricity 15 which may be a primary battery and the wire 76 to electrode 73. Because the two cells are connected so as to "buck" each other, hydrogen gas bubbling into the cell 78 through the tube 77 will be absorbed by the platinized black electrode 80 and will be oxidized to hydrogen ion, while the ferric ion entering cell 78 (bubbling up) through the tube 77 will be reduced on the bright electrode 81 to ferrous ion. The products of these two electrode reactions namely acid and ferrous ion will flow by the tube 79 back into cell 71, there to begin the cycle again. Since both cells are filled completely with liquid, a reserve reservoir 83 may be provided to take up any expansion or contraction of the fluids; the level of the liquid in the reservoir being at 84. Though the embodiment of the invention shown in Fig. 7 is very simple and useful for certain purposes, it is found that the refrigeration effect which is about 30° for the usual concentrations is insufficient for some purposes. To increase the effect, two or more units each similar to Fig. 7, may be employed in a "cascade" as shown in Fig. 8.

The "cascade" of two units 85 and 86, each similar to the unit in Fig. 7, is arranged so that heat given off by unit 85 will flow by some heat conducting means 87 from cell 88 to the heat absorbing cell 89. In this way the temperature of cell 90 may be retained at −10° C., the cells 88 and 89 being in heat exchange relations, may have the temperature 20° C., while the cell 91 may have the temperature 50° C. In this way the heat will be pumped up a temperature gradient of 30° in unit 85 and another 30° in unit 86 and by adding sufficient units in "cascade" arrangement may be discarded at any temperature.

It is characteristic of the embodiments shown in Figs. 4, 5, 6 and 7 that the electromotive force necessary to operate the cells is small, in many cases being about a tenth of a volt. This may be a disadvantage because of the large leads required to conduct reasonable currents through the cells at such low voltages. It is therefore usually of advantage to connect several of the double units in series as shown in perspective in Fig. 9.

Figure 9:
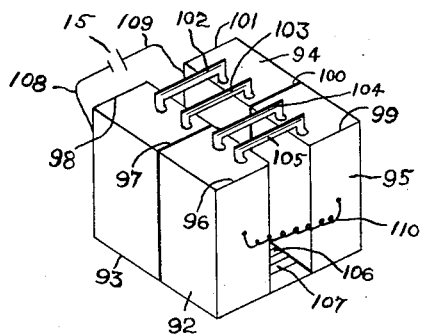
Fig. 9 shows in perspective a seventh embodiment of the invention.

Fig. 9 shows four cells 92, 93, 94 and 95 which may be of the type disclosed in connection with Fig. 5. Each of the cells contains a bright electrode and an electrode coated with platinum black. These electrodes can be placed in any suitable manner but conveniently they may each form a wall 96, 97, 98, 99, 100 and 101 of the cells. The electrodes 96 and 99 are coated with platinum black on the inside surface. The electrodes 98 and 101 are left bright on their inside surfaces, while electrodes 97 and 100 each conveniently form a septum separating cells 92 from 93 and 94 from 95. These septa 97 and 100 which must be made of electrically conducting material, are left bright on the sides facing into the cells 92 and 95 and are platinized on the sides facing into the cells 93 and 94. Two pipes 102 and 103 connect tops of cells 93 and 94. These pipes perform the function of the tubes 52 and 53 of Fig. 5. Similarly pipes 104 and 105 connect the tops of cells 92 and 95. The bottoms of cells 92 and 95 are connected by a pair of pipes 106 and 107, only partially shown in this drawing. Similarly, the bottoms of cells 93 and 94 are connected by two pipes analogous in function to the tubes 54 and 55 of Fig. 5. These pipes are not shown in the Fig. 9. All of the cells are filled with strong hydrochloric acid up to the top. A source of electricity shown diagrammatically as a primary battery 15 is connected by the wires 108 and 109 to the electrodes (98 and 101). A connecting wire 110 connects electrodes 96 and 99. When current is allowed to flow, heat will be absorbed by cells 92 and 93 while heat will be given off by cells 94 and 95. An insulating septum or merely an open space, as shown, may be placed between the heat absorbing and heat emitting cells. Because cells 92 and 93 are connected in series, a voltage drop across the two cells is twice that accross either cell separately. Similarly, the voltage drop across cells 94 and 95 is twice that of either cell separately. By adding further cells in series the voltage drop across the combination of cells may be made any desired amount. In practice it is desirable to have a voltage drop across the combination of cells of about two volts. Thus in usual construction ten or twenty units will be used in series in place of the two shown in Fig. 9.

Figure 10:
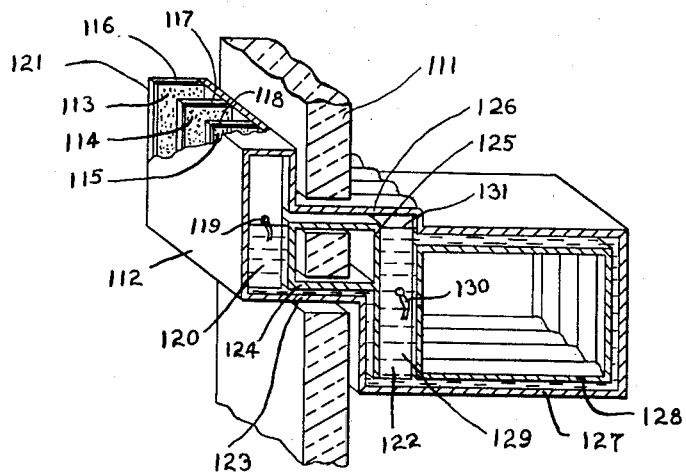
Fig. 10 shows in perspective an eighth and at present preferred embodiment of the invention.

Fig. 10 shows in perspective the embodiment of the invention at present preferred. This embodiment is similar to that shown in Fig. 9. The partition 111, shown in part, which may be part of the wall of a refrigerator separates the space into two parts, a hot zone to the left, and a cold zone which may be the inside of a refrigerator to the right. The box 112 in part cut away to show the internal construction is separated into a series of cells 113, 114, and 115 by means of partitions 116, 117 and 118. These partitions are of metal, one side being of bright platinum, and the other side blackened by carbon black. These partitions thus form the electrodes in a way substantially shown in Fig. 9. Separators may be used but are not shown in the drawing. These electrodes extend from the top to the bottom of the box 112, but do not necessarily fit the box tightly, allowing a certain seepage of electrolyte which stands to the level 131. The top parts of the separating plates preferably fit tightly as it is disadvantageous to allow leakage of gas from cell to cell. The end plates 120 and 121 are of metal and on the inside treated in such a way as to form the end electrodes of the series of cells 113, 114 and 115.

The box 112 communicates with a similar box 122 in the cold zone by means of a series of channels which may be similar to pipes 102—107 as shown in Fig. 9 or the channels may be formed by corrugating the plates 123, 124, 125 and 126. The drawings show only the corrugation on 126 but 123, 124 and 125 may be corrugated similarly. The spaces between plates 125 and 126 and between 123 and 124 are shown open in order to make the construction clear but, in fact, cover plates will be provided. The whole construction of cells and accompanying passages being hermetically sealed from the outside. The channels formed between the corrugated plates 125 and 126, lead into the top of the box 122, while the passages formed between the corrugated plates 123 and 124 lead to the bottom of box 122. The internal construction of the cells contained in box 122 is not shown but is substantially identical to that shown for the box 112. There may lead out of the box 122 a series of channels formed between corrugated plates 127 and 128 which plates are so bent as to form a loop. The space within the loop may serve as the freezing compartment of the refrigerator. Electrolyte which may be hydrochloric acid is placed in the cell combination filling it to the level 131. The back plates (not shown) of box 112 and 122 may be connected together electrically by leads (not shown). The front plate 129 of the box 122 may be provided with a lead 130. A source of direct current (not shown) is provided and connected to the leads 119 and 130 so the current will flow through the series of cells in the manner heretofore described.

While the mode of operation of the specific apparatus illustrated has been described, my method broadly comprises the interconversion of heat and electricity by carrying out the steps of the Carnot cycle by means of a reversible electrochemical reaction.

Other modes of applying a principle of this invention may be employed instead of those illustrated; changes being made as regards the means and processes herein disclosed, provided those stated by the following claims be employed.

I claim:

1. The method for the interconversion of heat and electricity by carrying out the steps of the Carnot cycle by means of a reversible electrochemical reaction comprising the steps of carrying out a reversible electrochemical reaction in one direction in a voltaic cell, transferring heat between said cell and a body, cooperatively carrying out said electrochemical reaction in the reverse direction in a second intercommunicating voltaic cell and transferring heat in the opposite direction between said second cell and a second body.

2. The process for the interconversion of heat and electricity comprising carrying out a reversible electrochemical reaction accompanied by a change in entropy in one direction in a voltaic cell, carrying out the reverse of said electrochemical reaction in a second voltaic intercommunicating cell at a lower temperature than in the first cell, passing electricity through said cells and transferring heat between at least one of said cells and a body.

3. The process for interconversion of electricity and heat comprising flowing electricity through a voltaic cell whereby a reversible electrochemical reaction characterized by a change of entropy is induced in an initial direction, transferring heat between said cell and a body, flowing electricity through a second intercommunicating voltaic cell whereby said reversible reaction is induced in the reverse direction, and transferring heat between said second cell and a second body.

4. The process of converting heat into electricity which comprises transferring at a higher temperature heat into a voltaic cell wherein a reversible electrochemical reaction occurs in such a direction as to absorb heat, said reaction being accompanied by passage of electric current through said cell in an initial direction and at a higher electric potential, at a lower temperature transferring heat out of a second intercommunicating voltaic cell wherein said reversible electrochemical reaction occurs in the reverse direction so as to give out heat, said reaction being accompanied by passage of electric current in the reverse of said initial direction at a lower electrical potential and utilizing the difference of electric potential.

5. Method for producing refrigeration which comprises the steps of passing an electric current through a voltaic cell in which a reversible electrochemical reaction occurs on passage of said current in such a direction as to absorb heat from a body to be cooled, and passing an electric current through a second intercommunicating voltaic cell in which said reversible electrochemical reaction occurs in the reverse direction in such a way as to produce heat, and transferring said heat at an elevated temperature from said second cell.

6. The process for absorbing heat at a low temperature and emitting heat at an elevated temperature, comprising the steps of absorbing heat at the lower temperature in an electrochemical cell in which a reversible reaction takes place in a primary direction accompanied by the passage of electricity and transferring heat from a second intercommunicating electrochemical cell wherein the reverse of said primary reaction occurs on the passage of electricity.

7. Apparatus for interconversion of heat and electricity comprising a first voltaic cell wherein on flow of electric current a reversible electrochemical reaction takes place in an initial direction accompanied by the absorption of heat, means for transferring heat to said cell from a body, a second voltaic cell intercommunicating with said first cell wherein on flow of electricity said electrochemical reaction takes place in the reverse direction accompanied by emission of heat and means for transferring heat from said second cell to a second body.

8. Apparatus for converting heat into electricity, which comprises a voltaic cell wherein a reversible electrochemical reaction occurs in an initial direction with a large change in entropy, means for transferring heat into said cell at an elevated temperature, means for passing a current through said cell in an initial direction, means for transferring heat from a second intercommunicating voltaic cell in which said electrochemical reaction occurs in a reverse direction and at a lower temperature, means for passing an electric current through said second cell at said lower temperature in a reverse direction and means for utilizing the net electric effect of the passage of said electric current.

9. Apparatus for producing refrigeration comprising a voltaic cell in which an electrochemical reaction occurs in such a primary direction as to absorb heat, means for transferring heat to said cell from a body to be cooled, a second intercommunicating voltaic cell wherein said reversible electrochemical reaction occurs in the reverse to said primary direction on the passage of current at an elevated temperature thereby producing heat and means for transferring heat from said cell.

10. Apparatus for absorbing heat at a low temperature and emitting heat at a high temperature, comprising a voltaic cell wherein on flow of electric current a reversible electrochemical reaction occurs at a lower temperature in an initial direction accompanied by the absorption of heat, means for transferring heat to said cell from a first body at a low temperature, a second intercommunicating voltaic cell wherein on flow of electricity said electrochemical reaction takes place in reverse direction at an elevated temperature accompanied by the emission of heat and means of transferring heat from said second cell to a second body at said elevated temperature.

11. Apparatus for conversion of heat and electricity comprising two similar reversible voltaic cells so connected that on passage of electric current a direct reaction will occur in one of said cells absorbing heat and the reverse reaction will occur in the other of said cells emitting heat, means for transferring heat to the first of said cells from a body, means for transferring heat from the second of said cells to a body, means for reversing the flow of electricity through said cells whereby heat is emitted from the first of said cells and heat is absorbed by the second of said cells, means of transferring heat from the first of said cells and means of transferring heat to the second of said cells.

12. Apparatus for the interconversion of heat and electricity comprising two similar reversible cells in one of which on the passage of electricity in a primary direction two gases are formed by the electrolysis of an electrolyte and in the other of which on the passage of electricity the two gases combine producing said electrolyte, means for passing said gases from the cell in which they are formed to the cell in which they are combined, means for passing the electrolyte from the cell in which it is formed to the cell in which it is electrolyzed, means for passing electric current through said cells, means for transferring heat between the first of said cells and a body and means for transferring heat between the second of said cells and a second body.

13. Means for refrigeration comprising a source of heat, means of transferring said heat to a first electrochemical cell in which a concentrated solution of hydrochloric acid is electrolyzed producing hydrogen gas and chlorine gas, means for transferring said hydrogen and chlorine gases to a second electrochemical cell wherein said gases on passage of electric current are combined to form hydrochloric acid, means for cooling said second cell, means for transferring said hydrochloric acid to said first cell, means for electrically connecting said cells in such a way that on absorbing of heat by said first cell current will flow through said cells, means for passing said current through an identical third cell in such a way that heat is given out in said third cell and heat is absorbed in a fourth identical cell, means for transferring heat into said fourth cell, means for transferring heat from said third cell, means for transferring hydrogen and chlorine gas formed in said fourth cell to said third cell and means for transferring hydrochloric acid from said third cell to said fourth cell on passage of current produced by the joint action of the first two cells.

14. Means for interconversion of heat and electricity comprising a lower cell, in which on passage of an electric current electrochemical reaction takes place producing reversibly from a primary electrolyte a gas and secondary electrolyte, means including a narrow tube for transferring said gas and said electrolyte by percolator action to an upper cell wherein the same reaction as occurs in the lower cell occurs in the reverse direction in the upper cell, thereby absorbing gas and secondary electrolyte and producing primary electrolyte, means for transferring primary electrolyte from upper cell to lower cell, means for transferring heat between said upper cell and a body, means for transferring heat between said lower cell and a body and means for the passage of an electric current through said cells.

FRANCIS R. BICHOWSKY.

References Cited in the file of this patent

UNITED STATES PATENTS

| Number | Name | Date |
|---|---|---|
| 484,182 | Dewey | Oct. 11, 1892 |
| 1,120,781 | Altenkirch et al. | Dec. 15, 1914 |
| 1,717,584 | Ruben | June 18, 1929 |
| 1,804,072 | Turrettini | May 5, 1931 |
| 1,818,437 | Stuart | Aug. 11, 1931 |

FOREIGN PATENTS

| Number | Country | Date |
|---|---|---|
| 494,811 | Germany | May 13, 1930 |